US 8,289,409 B2

(12) United States Patent
Chang

(10) Patent No.: US 8,289,409 B2
(45) Date of Patent: Oct. 16, 2012

(54) COMPACT CAMERA MODULE WITH LENS ARRAY

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 160 days.

(21) Appl. No.: 12/862,770

(22) Filed: Aug. 25, 2010

(65) Prior Publication Data

US 2011/0176020 A1 Jul. 21, 2011

(30) Foreign Application Priority Data

Jan. 20, 2010 (CN) .......................... 2010 1 0300466

(51) Int. Cl.
*H04N 5/225* (2006.01)
(52) U.S. Cl. ..................................... 348/218.1; 348/374
(58) Field of Classification Search ............... 348/218.1, 348/374
See application file for complete search history.

(56) References Cited

U.S. PATENT DOCUMENTS

| 2007/0002159 A1* | 1/2007 | Olsen et al. ................... 348/335 |
| 2007/0126898 A1* | 6/2007 | Feldman et al. ............... 348/294 |
| 2009/0268043 A1* | 10/2009 | Olsen et al. ................ 348/218.1 |
| 2010/0097491 A1* | 4/2010 | Farina et al. ............... 348/223.1 |
| 2010/0328471 A1* | 12/2010 | Boland et al. ............ 348/207.99 |

* cited by examiner

Primary Examiner — Gevell Selby
(74) Attorney, Agent, or Firm — Altis Law Group, Inc.

(57) ABSTRACT

A camera module includes a plurality of lenses with different focal lengths, a supporting plate, an image sensor, and a processor. The supporting plate defines a plurality of through holes receiving the corresponding lenses. The image sensor includes a sensing area. The sensing area is configured for receiving light through the lenses and the through holes and converting the light into electrical signals. The processor is electrically connected to the image sensor. The processor is configured for processing the electrical signals to form sub-images of a same view of same objects with different depths of field and then combining the sub-images into a final image.

7 Claims, 2 Drawing Sheets

COMPACT CAMERA MODULE WITH LENS ARRAY

BACKGROUND

1. Technical Field

The present disclosure relates to imaging technology and, particularly, to a camera module.

2. Description of Related Art

Nowadays, camera modules for forming an image of a subject on a solid-state imaging device via a lens system are used widely for digital still cameras and mobile phone cameras. In recent years, it has been required for camera modules to have a larger depth of field in combination with a lower profile. However, as the depth of field increases, a lens system is required to consist of more lenses, and therefore the thickness of the camera module tends to increase in the optical axis direction.

Therefore, it is desirable to provide a camera module, which can overcome or at least alleviate the above-mentioned problems.

DETAILED DESCRIPTION

Figure 1:
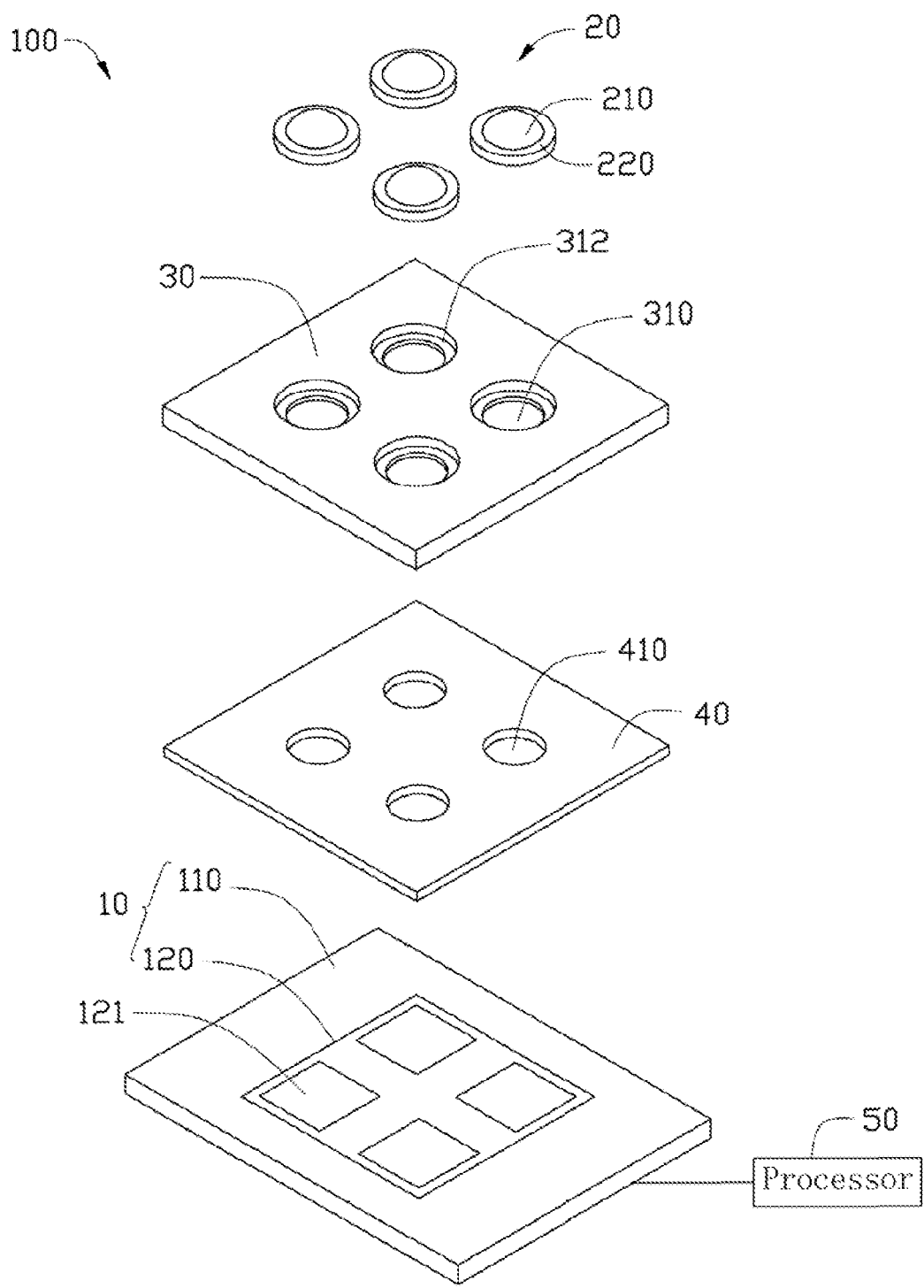
FIG. 1 is an exploded view of a camera module, according to a first exemplary embodiment.

Referring to FIG. 1, a camera module 100, according to a first exemplary embodiment, includes an image sensor 10, four lenses 20, a supporting plate 30, a spacer 40, and a processor 50. In this embodiment, the four lenses 20 are arranged in a rectangular array on a common plane.

The image sensor 10 is selected from the group consisting of a complementary metal oxide semiconductor (CMOS) image sensor and a charge coupled device (CCD) image sensor. The image sensor 10 includes a base 110 and a sensing area/region 120 in the center of the base 110 (i.e., centered upon the base 110). The sensing area/region 120 includes a plurality of sensing portions 121. In this embodiment, there are four sensing portions 121, and the four sensing portions 121 are arranged in a rectangular array corresponding to the lenses 20.

Each lens 20 may be made of glass or resin and can be an aspherical lens or a spherical lens for example. The lenses 20 have at least two different focal lengths. In this embodiment, each lens 20 has a different focal length. Each lens 20 includes an optical portion 210 and a peripheral portion 220 surrounding the optical portion 210.

The supporting plate 30 defines four through holes 310 corresponding to the four lenses 20. A step 312 is formed in each through hole 310. The peripheral portion 220 is supported by the step 312 and the optical portion 210 is aligned with the through hole 310.

The spacer 40 is positioned between the supporting plate 30 and the image sensor 10. The spacer 40 has a shape similar to the sensing area/region 120 and defines four apertures 410 corresponding to the four sensing portions 121. In this embodiment, the apertures 410 have fixed diameters.

The image sensor 10, the spacer 40, the supporting plate 30 with the lenses 20 are arranged in that order along a direction from the image side to the object side of the camera module 100. Each lens 20 is received in a corresponding through hole 310 and is aligned with a corresponding aperture 410 and a corresponding sensing portion 121. Each lens 20 and a corresponding sensing portion 121 cooperatively form an image-formation unit. The lenses 20 are all aimed to capture same view of an area being photographed but with a different depth of field. The sidewall of each through hole 310 prevents interference of optical signals between the individual image-formation units.

When the camera module 100 is activated, in each image-formation unit, light passes through the lens 20, the corresponding through hole 310, the corresponding aperture 410 and finally reaches the corresponding sensing portion 121. Each sensing portion 121 receives the light and converts the light into electrical signals. The processor 50 processes the electrical signals respectively from the four sensing portions 121 to form four different sub-images and synthesizes the four sub-images to be a final image. In particular, each sub-image corresponds to an image-formation unit, and the four image-formation units have four depths of field as the four lenses 20 have four different focal lengths. Therefore, the four sub-images are of the same area and include the same subjects, but because of the different depth of field settings, different subjects at different distances from the camera module 100 in the field of view can be captured in sharp focus. Then, the four sub-images are combined into one image having a very great depth of field without having to use stacked lenses, thus saving space. As a result, the final image includes the different clear subjects with different depths of field. Thus the camera module 100 has a greater depth of field while at the same time can be made thinner than the typical camera module.

Figure 2:
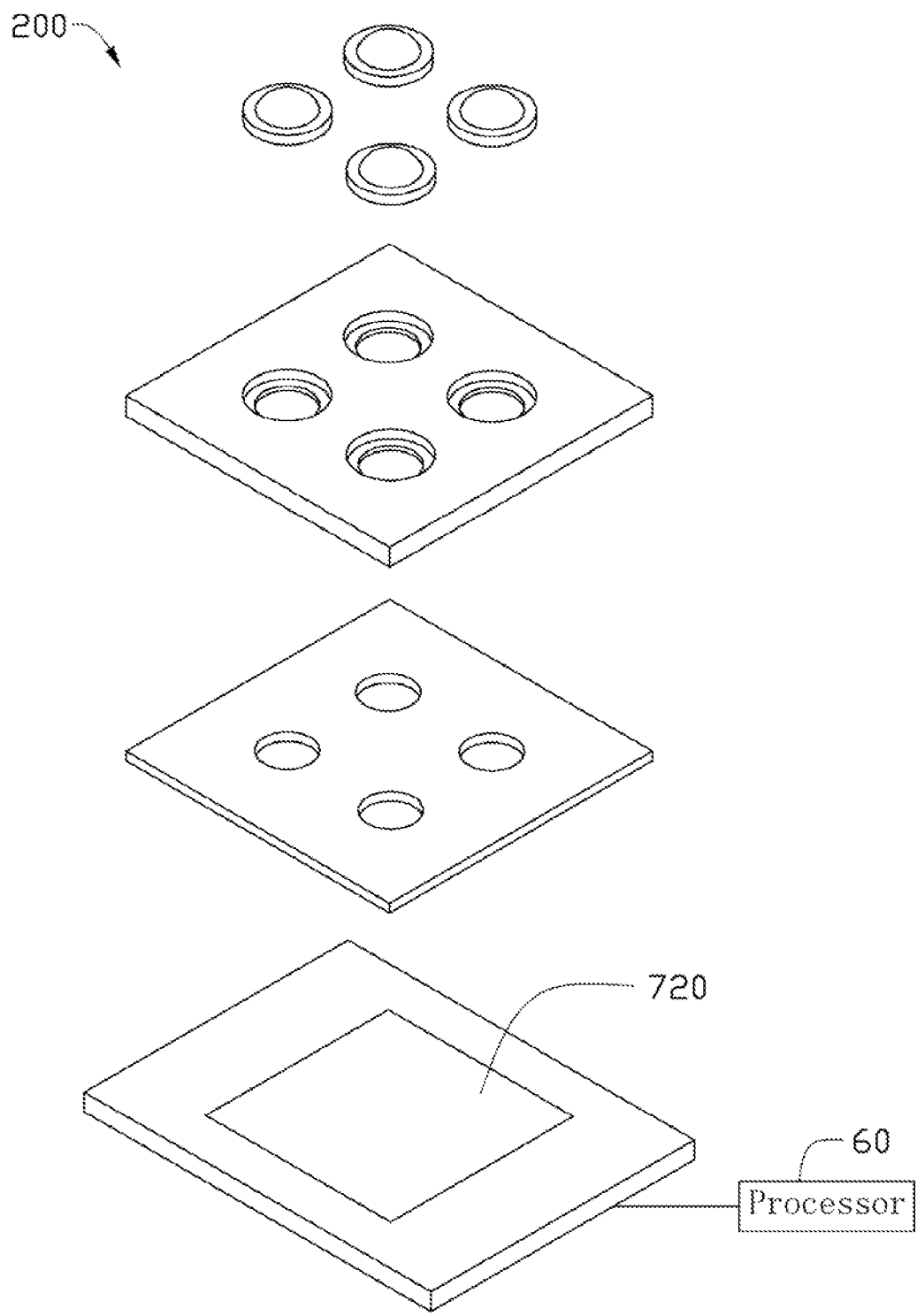
FIG. 2 is an exploded view of a camera module, according to a second exemplary embodiment.

Referring to FIG. 2, a camera module 200, according to a second exemplary embodiment, is shown. The difference between the camera module 200 of this embodiment and the camera module 100 of the first embodiment is: the sensing area/region 720 is a single unit and not divided into separate sensing portions. When the camera module 200 is activated, the sensing area/region 720 receives the light and converts the light into electrical signals. The processor 60 processes the electrical signals respectively from the sensing area/region 720 to form four sub-images and synthesizes the four sub-images to be a final image as detailed above.

Advantages of the camera module 200 of this embodiment are similar to those of the camera module 100 of the first embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A camera module, comprising:
   a plurality of lenses with different focal lengths;
   a supporting plate defining a plurality of through holes receiving the corresponding lenses;
   an image sensor comprising a sensing area configured for receiving light through the lenses and the through holes and converting the light into electrical signals;
   a spacer positioned between the supporting plate and the image sensor, the spacer defining a plurality of apertures spatially corresponding to the lenses; and
   a processor electrically connected to the image sensor, the processor configured for processing the electrical signals to form sub-images of a same view of same objects with different depths of field and then combining the sub-images into a final image.

2. The camera module as claimed in claim 1, wherein the sensing area comprises a plurality of sensing portions optically aligned with the lenses.

3. The camera module as claimed in claim 1, wherein the shape of the spacer conforms to that of the seining area.

4. The camera module as claimed in claim 3, wherein the image sensor is a complementary metal oxide semiconductor.

5. The camera module as claimed in claim 3, wherein the image sensor is a charged coupled device.

6. The camera module as claimed in claim 3, wherein each lens is made of glass or resin.

7. The camera module as claimed in claim 3, wherein each lens is an aspherical lens or a spherical lens.

* * * * *